UNITED STATES PATENT OFFICE.

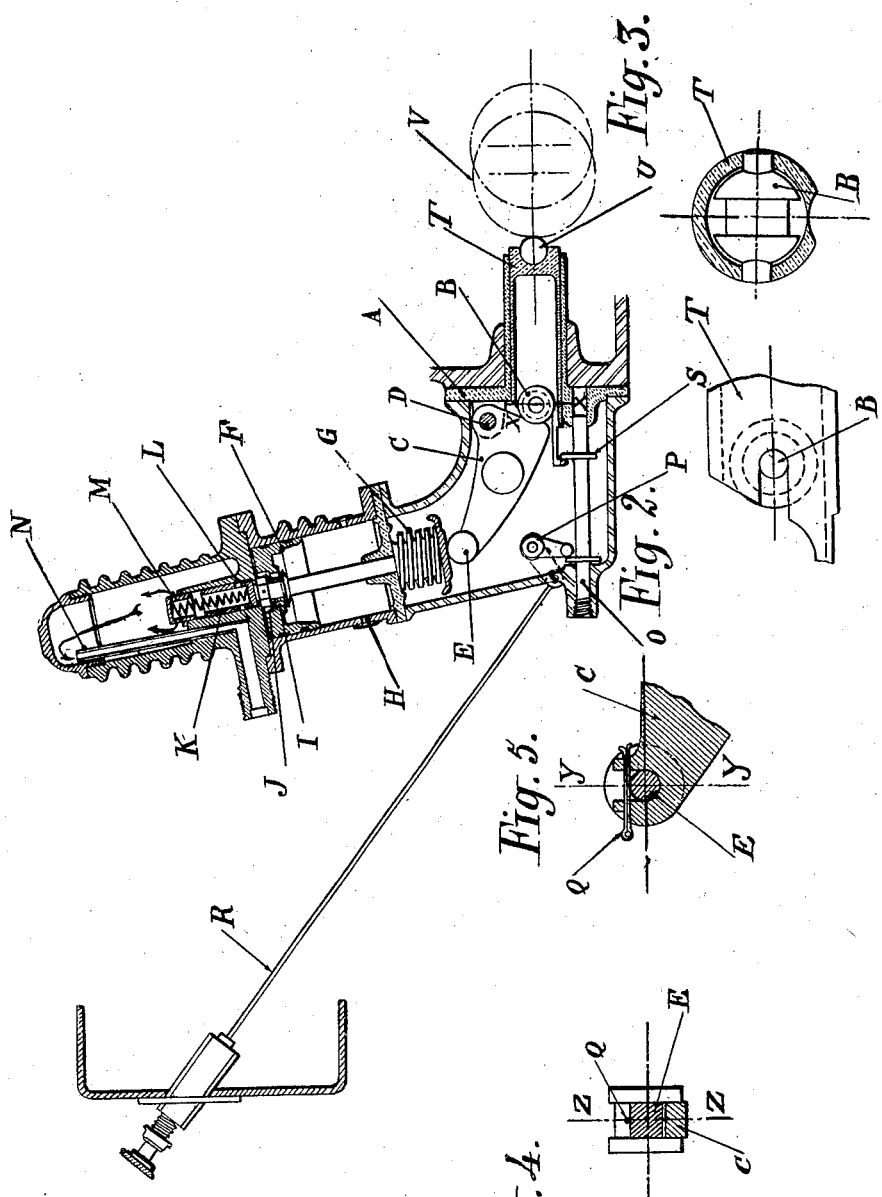

MARIUS JEAN BAPTISTE BARBAROU, OF PARIS, FRANCE.

AIR-COMPRESSOR FOR MOTOR-VEHICLE TIRES.

1,385,332.   Specification of Letters Patent.   Patented July 19, 1921.

Application filed March 30, 1921. Serial No. 456,935.

*To all whom it may concern:*

Be it known that I, MARIUS JEAN BAPTISTE BARBAROU, citizen of the French Republic, residing at Paris, in the Republic of France, have invented new and useful Improvements in Air-Compressors for Motor-Vehicle Tires, (for which I have filed an application in France January 3, 1920,) of which the following is a specification.

This invention relates to an air compressing device for the inflation of pneumatic tires. The air compressor may be actuated either by an element of the change-speed box which is caused to rotate when the vehicle is stopped or by the cam shaft of the motor, and is essentially characterized by the following features:

A. The device actuating the compressor piston, which comprises a flat lever bearing upon a driving member and disposed within the groove of a roller and likewise acting upon the piston through the medium of a roller partially surrounding the said lever.

B. The construction of the piston provided with the suction valve thereof.

C. The device used for stopping the compressor, this being constituted by a rod actuating the said driving member whereby the piston is caused to assume the upper position.

The accompanying drawings show by way of example an embodiment of this invention, wherein:

Figure 1 is a vertical axial section of an air compressor for the inflation purposes constructed according this invention.

Fig. 2 is a cross section on the line X—X, Fig. 1, of the horizontal sliding cylinder, showing the details of the roller impelling the lever used to actuate the piston.

Fig. 3 is a corresponding front elevational view of the end of the said cylinder.

Fig. 4 is a cross section on the line Y—Y, Fig. 5, of the end of the lever used for raising the piston.

Fig. 5 is a cross section on the line Z—Z, Fig. 4.

Upon the wall of the casing containing the device used for actuating the compressor is disposed a gun-metal guiding member A having slidable therein an impelled cylinder T provided with a roller U co-acting with the actuating cam V, the other end of the cylinder T being provided with a roller B whose form is represented in Fig. 3. The groove of the said roller is adapted to receive a lever C pivoted at D about a fixed point, the other end of the said lever being provided with a roller E, Figs. 4 and 5. It is observed that the roller E is caused to bear at the narrow part thereof upon the lever within a fork-shaped opening, and that a pin Q is disposed across the top of the narrowed portion of the said roller whereby the latter is prevented from lifting. The movement of the lever C causes the piston F to move upwardly, and a return spring G draws back the piston when it is no longer acted upon by the said lever.

At the moment of suction, that is, upon the descent of the piston, the air entering below the piston through the apertures H, which are provided with dust filtering wire gauze members, passes thence through the apertures I and raises the puppet valve J. During the compression stroke, the puppet valve J again falls upon its seat and the compressed air raises the valve K which is provided with the orifices L permitting the air to enter the inner part of the valve and to pass through the apertures M into the upper receptacle. The said receptacle has a relatively great capacity, and the air is conducted by the tube N to the upper part of the receptacle in such manner that in case a small quantity of oil should be introduced by the compressor, the same will be deposited upon the bottom of the receptacle whereby dry air will be supplied in all cases to the tires.

To avoid the operation of the compressor during the running of the vehicle, the actuating piston may be drawn back by the rod O by means of the lever P which is operated from the exterior by a suitable control device R. The said rod is provided with a shoulder S impelling the piston T and disposing the latter in such position that the actuating cam V shall be inoperative. For operating the apparatus, the control device R is caused to drive back the lever P, and the spring G of the air-compressing piston F will now act upon the lever C and will thus tend to maintain the contact of the actuating piston T with the cam V driving the said piston.

Having now described my invention, what I claim as new and desire to secure by Letters Patent is:

1. An air compressor for pneumatic tires of motor vehicles, comprising in combination, a cam, a pusher actuated by the said cam, a guideway having the said pusher slidable therein, a swinging lever, means for operatively connecting the said pusher to the said swinging lever, a cylinder, a piston slidable within the said cylinder, means for operatively connecting the said swinging lever to the said piston, means for admitting air into the said cylinder, an air chamber connected with the said cylinder, means for opening and closing the passage between the cylinder and the said air chamber, and means for evacuating the compressed air.

2. An air compressor for pneumatic tires of motor vehicles, comprising in combination a cam, a pusher actuated by the said cam, a guideway having the said pusher slidable therein, a roller pivotally supported in one end of the said pusher, an annular groove formed in the said roller, a swinging lever contacting in the said groove of the roller, a cylinder, a piston slidable within the said cylinder, means for operatively connecting the said swinging lever to the said piston, means for admitting air into the said cylinder, an air chamber connected with the said cylinder, means for opening and closing the passage between the cylinder and the said air chamber, and means for evacuating the compressed air.

3. An air compressor for pneumatic tires of motor vehicles, comprising in combination, a cam, a pusher actuated by the said cam, a guideway having the said pusher slidable therein, a swinging lever, a fork shaped opening formed at the upper end of said lever, a cylinder, a piston slidable within the said cylinder, a piston rod, a roller provided with trunnions journaled in the fork shaped opening of the swinging lever and contacting the said piston rod, a pin passing through the walls of the said fork shaped opening above the trunnions of the said roller, yielding means for effecting the return of the piston toward the said swinging lever, means for admitting air into the said cylinder, an air chamber connected with the said cylinder, means for opening and closing the passage between the cylinder and the said air chamber, and means for evacuating the compressed air.

4. An air compressor for pneumatic tires of motor vehicles comprising in combination, a cam, a pusher actuated by the said cam, a guideway having the said pusher slidable therein, a swinging lever, means for operatively connecting said pusher to the said swinging lever, a cylinder, a piston slidable within the said cylinder, means for operatively connecting the swinging lever to the said piston, air admission apertures provided at the lower part of the said cylinder, wire gauze members disposed upon the said apertures, apertures formed through the body of the piston and disposed concentrically therewith, a puppet valve adapted to close the said apertures under the action of the compressed air, an air chamber connected with the said cylinder, means for opening and closing the passage between the cylinder and the air chamber, and means for evacuating the compressed air.

5. An air compressor for pneumatic tires of motor vehicles, comprising in combination a cam, a pusher actuated by the said cam, a guideway having the said pusher slidable therein, a swinging lever, means for operatively connecting the said pusher to the said swinging lever, a cylinder, a piston slidable within the said cylinder, means for operatively connecting the said swinging lever to the said piston, means for admitting air into the said cylinder, an air chamber connected with the said cylinder, a tubular puppet valve slidable in the passage situated between the cylinder and the said air chamber, apertures formed in the said puppet valve for admission of compressed air to the interior of the said puppet valve, apertures formed in the puppet valve for the discharge of the said compressed air into the said air chamber at one end thereof, yielding means for effecting the return of the said puppet valve toward the cylinder, and means for evacuating the compressed air.

6. An air compressor for pneumatic tires of motor vehicles, comprising in combination, a cam, a pusher actuated by the said cam, a guideway having the said pusher slidable therein, a swinging lever, means for operatively connecting the said pusher to the said swinging lever a cylinder, a piston slidable within the said cylinder, means for operatively connecting the said swinging lever to the said piston, means for admitting air into the said cylinder, an air chamber connected with the said cylinder, a tubular puppet valve slidable in the passage situated between the cylinder and the said chamber, apertures formed in the said puppet valve for admission of compressed air to the interior of the said puppet valve, apertures formed in the puppet valve for the discharge of the said compressed air at one end thereof, a compressed air evacuation tube opening at the other end of the said chamber, and elastic means for effecting the return of the said puppet valve toward the cylinder.

7. An air compressor for pneumatic tires of motor vehicles, comprising in combination, a cam, a pusher actuated by the said cam, a guideway having the said pusher slidable therein, a swinging lever, means for operatively connecting the said pusher to the said swinging lever, a cylinder, a piston slidable within the said cylinder, means for operatively connecting the said swinging lever to the said piston, means for admitting air into the said cylinder, an air chamber connected with the said cylinder, means for opening and closing the passage between the cylinder and the said air chamber, means for evacuating the compressed air and means for disconnecting the pusher from the cam.

In testimony whereof I have signed my name to this specification.

MARIUS JEAN BAPTISTE BARBAROU.